(12) United States Patent
Okuno et al.

(10) Patent No.: US 6,724,525 B2
(45) Date of Patent: Apr. 20, 2004

(54) RAMAN AMPLIFYING CONTROL UNIT AND OPTICAL TRANSMISSION SYSTEM

(75) Inventors: Toshiaki Okuno, Kanagawa (JP); Eisuke Sasaoka, Kanagawa (JP); Masayuki Nishimura, Kanagawa (JP); Shigeru Tanaka, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 11 days.

(21) Appl. No.: 09/788,659

(22) Filed: Feb. 21, 2001

(65) Prior Publication Data

US 2001/0040719 A1 Nov. 15, 2001

(30) Foreign Application Priority Data

Feb. 22, 2000 (JP) ........................................ 2000-044633

(51) Int. Cl.$^7$ ................................................. H01S 3/00
(52) U.S. Cl. ....................................................... 359/334
(58) Field of Search .............................. 259/334; 372/3

(56) References Cited

U.S. PATENT DOCUMENTS 5,966,206 A * 10/1999 Jander ........................ 356/73.1
6,188,508 B1 * 2/2001 Horiuchi et al. ............. 359/334
6,344,923 B1 * 2/2002 Blondel et al. .............. 359/334

FOREIGN PATENT DOCUMENTS

JP       03013863 A       1/1991       ......... G01M/11/02

OTHER PUBLICATIONS

Kikuchi et al., Measurement of Raman Scattering in Single–Mode Optical Fiber by Optical Time–Domain Reflectometry. IEEE Journal of Quantum Electronics, vol. 24, No. 10, Oct. 1998 pp. 1973–1975.*
Sato et al. A 1.6 micrometer Band OTDR Usiing a Synchronous Raman Fiber Amplifier. IEEE Photonics Technology Letters, vol. 00, NO. O, Aug. 1992, pp. 923–924.*
Gripp et al. The Dispersion–OTDR. OFCC, Feb. 21–26, 1999. pp, 273–275.*

* cited by examiner

Primary Examiner—Thomas G. Black
Assistant Examiner—Deandra Hughes
(74) Attorney, Agent, or Firm—McDermott, Will & Emery

(57) ABSTRACT

Disclosed are an optical transmission system and a Raman amplifying control unit that can stabilize the effective loss of a transmission line even if the optical transmission system has a relay station between a transmitting station and a receiving station. The optical transmission system and the Raman amplifying control unit have an introducing means for outputting inspection light and introducing it to the transmission line, a receiving means for receiving the backscatter from the inspection light, and a control means for inspecting the transmission line and controlling an exciting light supplying means according to the received backscattering light. The introducing means, the receiving means, and the control means are provided together with the exciting light supplying means in a station at the transmitting side or receiving side of a relay section in the optical transmission system.

13 Claims, 10 Drawing Sheets

RAMAN AMPLIFYING CONTROL UNIT AND OPTICAL TRANSMISSION SYSTEM

BACKGROUND OF THE INVENTION

1. Field of the Invention

The present invention relates to an optical transmission system which Raman-amplifies, as well as transmits, signal light in an optical transmission line of a relay section, and to a Raman amplifying control unit which controls the Raman amplification of the signal light in the optical transmission system.

2. Related Background Arts

An optical fiber amplifier, which amplifies signal light so as to compensate the loss of signal light propagating through an optical transmission line in an optical transmission system, is equipped with an optical fiber for optical amplification and a means of supplying exciting light. Pump light of a given wavelength is supplied to the optical fiber for optical amplification by the exciting light supplying means, so that the signal light that is inputted to the optical fiber for optical amplification is amplified in the optical fiber for optical amplification and is outputted.

For such an optical fiber amplifier, there have been a Raman amplifier using Raman amplification phenomenon and a rare-earth-added optical fiber amplifier using an optical fiber for optical amplification in which a rare earth element is added to the light waveguide region thereof. The rare-earth-added optical fiber amplifier is modularized and is installed in a repeater and the like. On the other hand, the Raman amplifier uses an optical fiber for optical amplification (optical fiber for Raman amplification) in the optical transmission line or the part thereof in a relay section, and the optical amplification of the signal light is done therein. Therefore, if a Raman amplifier is used, not only can the effective loss (=transmission loss−Raman amplification gain) of an optical transmission line be reduced, but also the influence of an optical Kerr effect that is caused by the power of signal light that becomes too great in the various parts of the optical transmission line can be restrained.

In the optical transmission system that uses a Raman amplifier, it is important for the effective loss to be temporally stable in order to perform stable high-speed optical communication. Actually, however, there are cases where the effective loss varies because the Raman amplification gain of signal light by the Raman amplifier fluctuates due to the temporal variation of the transmission loss or the thermal or temporal variation of an exciting light source which outputs pump light for Raman amplification.

Such being the case, an invention for stabilizing the effective loss of an optical transmission line in an optical transmission system using a Raman amplifier is disclosed in Japanese Patent Application Laid-Open No. 3-13836. In this invention, an attempt is made in order to stabilize the effective loss by (1) introducing inspection light into the optical transmission line, (2) receiving the back-scattering light that arises when the inspection light propagates through an optical transmission line, (3) seeking, based on the results of the received back-scattering light, the loss distribution in a longitudinal direction of the optical transmission line, and (4) controlling, according to the loss distribution thus obtained, pump light for Raman amplification to be supplied into an optical transmission line.

In the above invention, only one set of inspection light introducing means for introducing inspection light into the optical transmission line, receiving means for receiving back-scattering light, and a means for controlling the pump light to be supplied to the optical transmission line are provided in a transmitting station or its vicinity. On the other hand, the exciting light supplying means for supplying pump light to the optical transmission line are provided at plural points of the optical transmission line from the transmitting station to the receiving station. Thus, the loss distribution of the optical transmission line from the transmitting station to the receiving station is measured by the inspection light introducing means and the back-scattering light receiving means that are provided in the transmitting station or its vicinity. All of the exciting light supplying means provided at plural points of the optical transmission line from the transmitting station to the receiving station are controlled altogether by the control means provided in the transmitting station or its vicinity.

SUMMARY OF THE INVENTION

An object of the present invention is to provide a Raman amplifying control unit that can stabilize the effective loss of signal light in an optical transmission line of an optical transmission system having a relay station between a transmitting station and a receiving station, and an optical transmission system using the same.

A Raman amplifying control unit according to the present invention, which can control an exciting light supplying means for supplying pump light into an optical transmission line so as to Raman-amplify signal light in the optical transmission line of an optical transmission system having at least one relay station, is equipped with (1) a means for outputting inspection light to inspect an optical transmission line and introducing the inspection light into the optical transmission line, (2) a means for receiving a back-scattering light which arises when the inspection light propagates through the optical transmission line, and (3) a means for controlling the supply of pump light to the optical transmission line from the exciting light supplying means, such control being made according to the results of inspecting the optical transmission line based on the results of receiving the back-scattering light by the back-scattering light receiving means. Moreover, the inspection light introducing means, the back-scattering light receiving means, and the control means are provided together with the exciting light supplying means in a station on the transmitting side or receiving side of the optical transmission line in the relay section of the optical transmission system.

Here, the term "relay section" means a section between a transmitting station and a relay station, between relay stations, or between a relay station and a receiving station. A transmitting station, a receiving station, and a relay station are generically referred to as a "station".

In an embodiment of a Raman amplifying control unit according to the present invention, wherein a station is a relay station, inspection light is introduced from the relay station into the optical transmission line on the upper stream side and the optical transmission line on the downstream side, respectively; in another embodiment, the inspection light introducing means introduces inspection light into the optical transmission line in a prescribed polarization state; in another embodiment, the light used as the inspection light has a plurality of wavelengths; in another embodiment, an inspection light source that can vary an output wavelength is used; and in another embodiment, the control means controls the supply of pump light according to the results of comparison between the received back-scattering light and a standard signal.

In an optional aspect of the Raman amplifying control unit of the present invention, the inspection light introducing means has a switching means.

In an embodiment of an optical transmission system according to the present invention, a Raman amplifying control unit controls the power of supplied pump light so that the power of signal light propagating through the optical transmission line on the downstream side does not exceed a pre-determined maximum value.

In another embodiment, a Raman amplifying control unit controls the power of the supplied pump light so that the power of signal light propagating through an optical transmission line on the upper stream side does not become lower than the pre-determined minimum value.

In an optional aspect of the Raman amplifying control unit of the present invention, an optical fiber amplifier is provided together with the Raman amplifying control unit in a station.

The above and further objects and novel features of the present invention will be more fully clarified from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Figure 1:
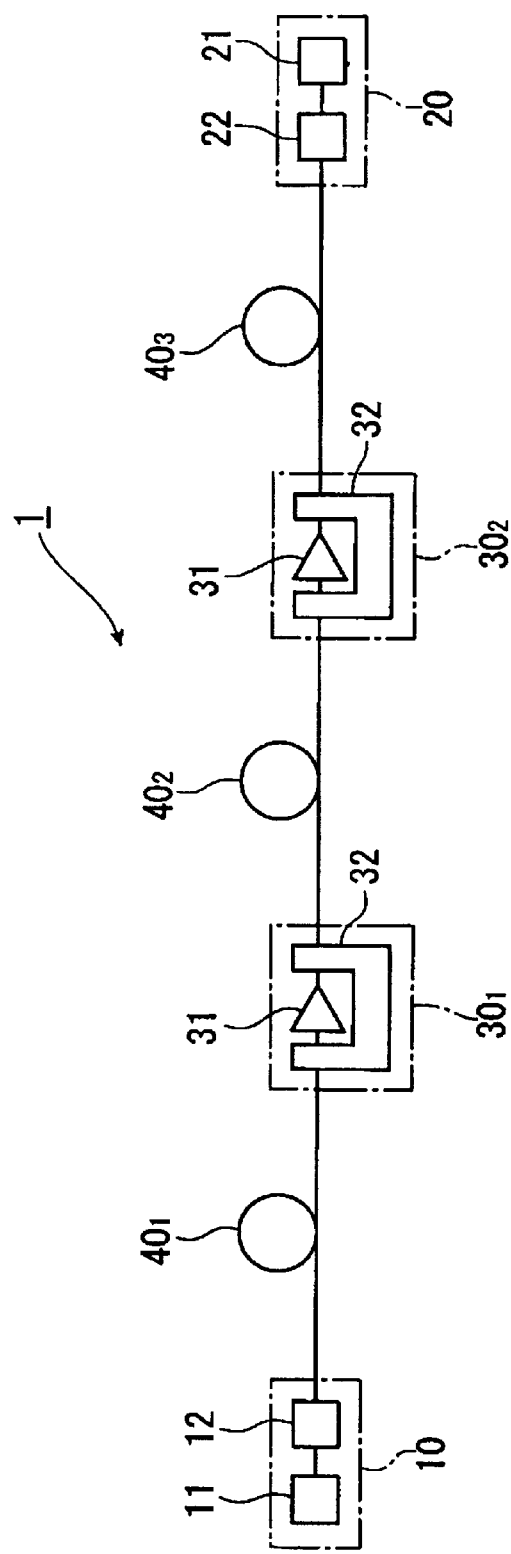
FIG. 1 is a schematic diagram of an optical transmission system according to the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

(Embodiment of Optical Transmission System)

First, an embodiment of an optical transmission system according to the present invention is explained using FIG. 1.

In the optical transmission system 1, a relay station $30_1$ and a relay station $30_2$ are provided between a transmitting station 10 and a receiving station 20. The transmitting station 10 and the relay station $30_1$ are connected through an optical transmission line $40_1$, the relay station $30_1$ and the relay station $30_2$ are connected through an optical transmission line $40_2$, and the relay station $30_2$ and the receiving station 20 are connected through an optical transmission line $40_3$.

Each of the optical transmission lines $40_1$ through $40_3$ is a transmission medium that transmits signal light outputted from the transmitting station 10 and is also an optical amplification medium that Raman-amplifies the signal light. Each of the optical transmission lines $40_1$ through $40_3$ has preferably an absolute magnitude of the chromatic dispersion as small as possible in the signal light wavelength band (the 1.55 μm wavelength band), and a dispersion-shifted optical fiber that has a zero dispersion wavelength near the 1.55 μm wavelength is preferably used, for example. Generally, when the absolute magnitude of the chromatic dispersion is small at the signal light wavelength, the waveform degradation of signal light due to a nonlinear optical phenomenon (especially the optical Kerr effect) becomes a problem. However, in the present embodiment, the power of signal light does not become excessive anywhere on the optical transmission lines $40_1$ through $40_3$, and the influence of the optical Kerr effect can be decreased, because the signal light is Raman-amplified in each of the optical transmission lines $40_1$ through $40_3$.

The transmitting station 10 is equipped with a transmitter 11 and a Raman amplifying control unit 12. The receiving station 20 is equipped with a receiver 21 and a Raman amplifying control unit 22. Also, each of the relay stations $30_1$ and $30_2$ is equipped with an Erbium-doped fiber amplifier (EDFA) 31 and a Raman amplifying control unit 32.

The Raman amplifying control unit 12 introduces light for inspecting the optical transmission line $40_1$ in the propagating direction of signal light, and receives the back-scattering light that arises when the inspection light propagates through the optical transmission line $40_1$, and based on the results of such reception, inspects the optical transmission line $40_1$. Then, according to the results of such inspection, it controls the supply of the pump light for Raman amplification into the optical transmission line $40_1$. Similarly, the Raman amplifying control unit 22 controls the supply of the pump light for Raman amplification into the optical transmission line $40_3$; the Raman amplifying control unit 32 provided in the relay station $30_1$ controls the supply of the pump light for Raman amplification into the optical transmission lines $40_1$ and $40_2$; and the Raman amplifying control unit 32 provided in the relay station $30_2$ controls the supply of the pump light for Raman amplification into the optical transmission lines $40_2$ and $40_3$.

Figure 2:
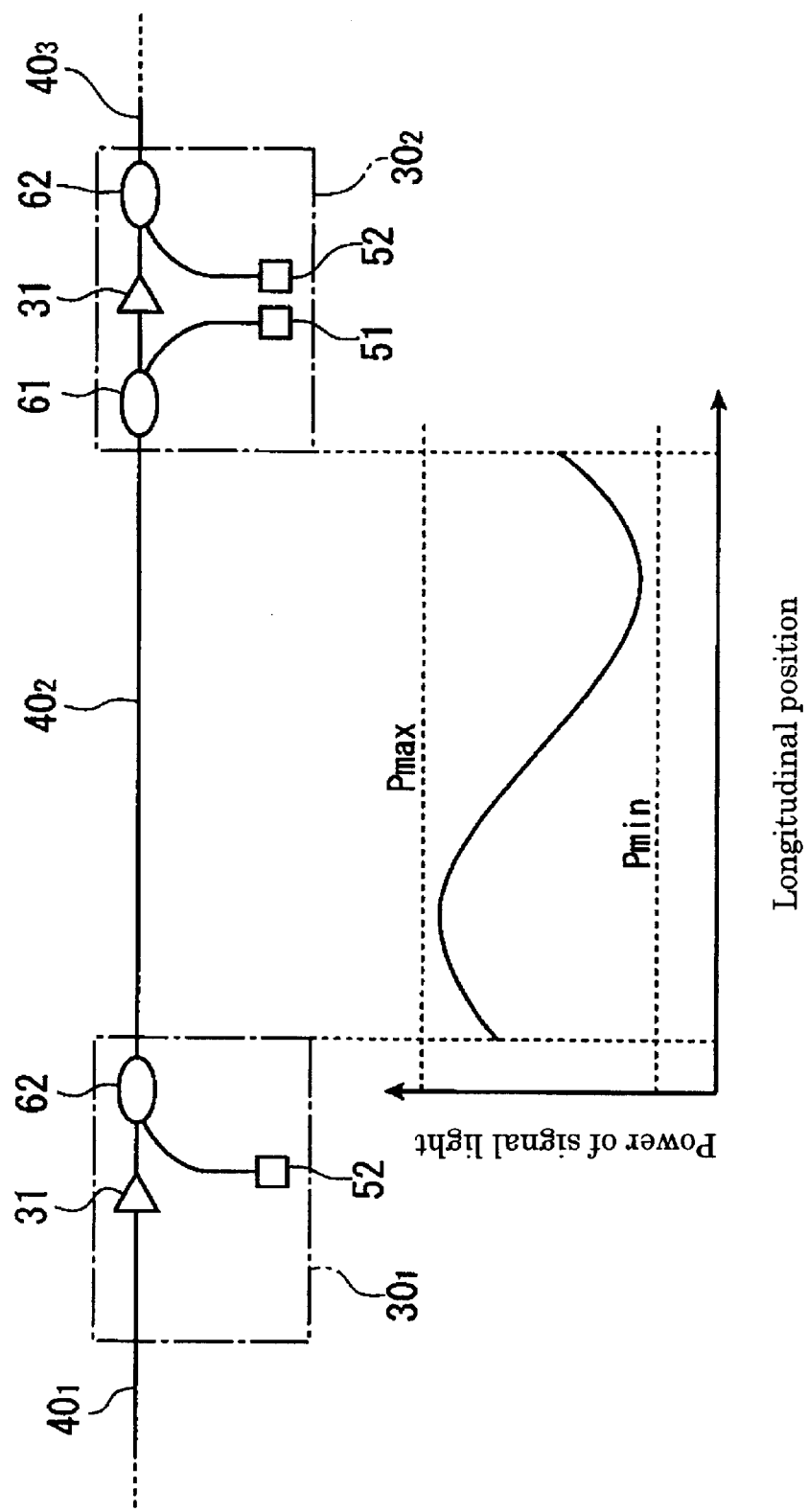
FIG. 2 illustrates the control of the supply of pump light for Raman amplification into an optical transmission line in an optical transmission system according to the present invention.

FIG. 2 illustrates the control of the supply of pump light for Raman amplification into an optical transmission line in the optical transmission system 1 according to the present invention.

FIG. 2 shows the exciting light supplying means (an exciting light source 52 and a optical coupler 62) provided in the relay station $30_1$, the exciting light supplying means (exciting light sources 51, 52 and optical couplers 61, 62) provided in the relay station $30_2$, and the optical transmission lines $40_1$ through $40_3$. The signal light power in every position of the optical transmission line $40_2$ is also shown in this figure. The illustration of the Raman amplifying control unit 32 in each of the relay stations $30_1$ and $30_2$ is omitted.

The signal light (the 1550 nm wavelength band) propagates through the optical transmission line $40_1$, the relay station $30_1$, the optical transmission line $40_2$, the relay station $30_2$, and the optical transmission line $40_3$ in the enumerated order. The pump light for Raman amplification (e.g., wavelength of about 1450 nm, which is about 0.1 µm shorter than the signal light wavelength), is emitted from the exciting light sources 51 and 52 in the relay stations $30_1$ and $30_2$, and is supplied into the optical transmission line $40_2$ through the optical coupler 62 in the same direction as the signal light propagates, and into the optical transmission line $40_3$ through the optical coupler 61 in the direction opposite to the propagation of the signal light, respectively. The signal light propagating through the optical transmission line $40_2$ suffers the transmission loss that is peculiar to the optical transmission line $40_2$, but is Raman-amplified at the same time. Therefore, as shown in FIG. 2, the power of the signal light propagating through the optical transmission line $40_2$ typically tends to increase for a while after inputted into the optical transmission line $40_2$, then turns to decrease, and again tends to increase.

The Raman amplifying control unit in each of the relay stations $30_1$ and $30_2$ controls the supply of the pump light from each exciting light source into the optical transmission line $40_2$ as follows. That is, the Raman amplifying control unit in the relay station $30_1$ controls the power or wavelength of the pump light to be supplied into the optical transmission line $40_2$ from the exciting light source 52 such that the power of the signal light propagating through the optical transmission line $40_2$ does not exceed a pre-determined maximum value, Pmax. By conducting such control, the influence of the optical Kerr effect due to the excessive power of the signal light can be restrained, and the waveform degradation of signal light can be restrained. Also, the Raman amplifying control unit in the relay station 302 controls the power or wavelength of the pump light to be supplied into the optical transmission line $40_2$ from the exciting light source 51 such that the power of the signal light propagating through the optical transmission line $40_2$ does not become lower than a pre-determined minimum value, Pmin. Thus, the deterioration of S/N ratio of the signal light can be restrained.

Because an inspection of an optical transmission line is conducted in every relay section, the SIN ratio of the measurement of the loss distribution never becomes poor even if the distance of an optical transmission line from the transmitting station to the receiving station is long, and the effective loss of signal light in the optical transmission line can be stabilized.

Also, even if an optical transmission system has an optical component including an optical isolator such as an optical fiber amplifier, it is possible to receive back-scattering light arising in all relay sections thereof by a back-scattering light receiving means provided on the transmitting side or receiving side thereof; hence it is possible to measure the loss distribution of any part of the optical transmission line of every relay section. Therefore, it is possible to stabilize the effective loss of signal light in the optical transmission line of all relay sections.

Also, because an exciting light supplying means provided at a plurality of points in an optical transmission line from a transmitting station to a receiving station can be controlled by a control means provided in the vicinity of each exciting light supplying means, it is unnecessary to provide a long-range control line apart from the optical transmission line.

(First Embodiment of Raman Amplifying Control Unit)

Figure 3:
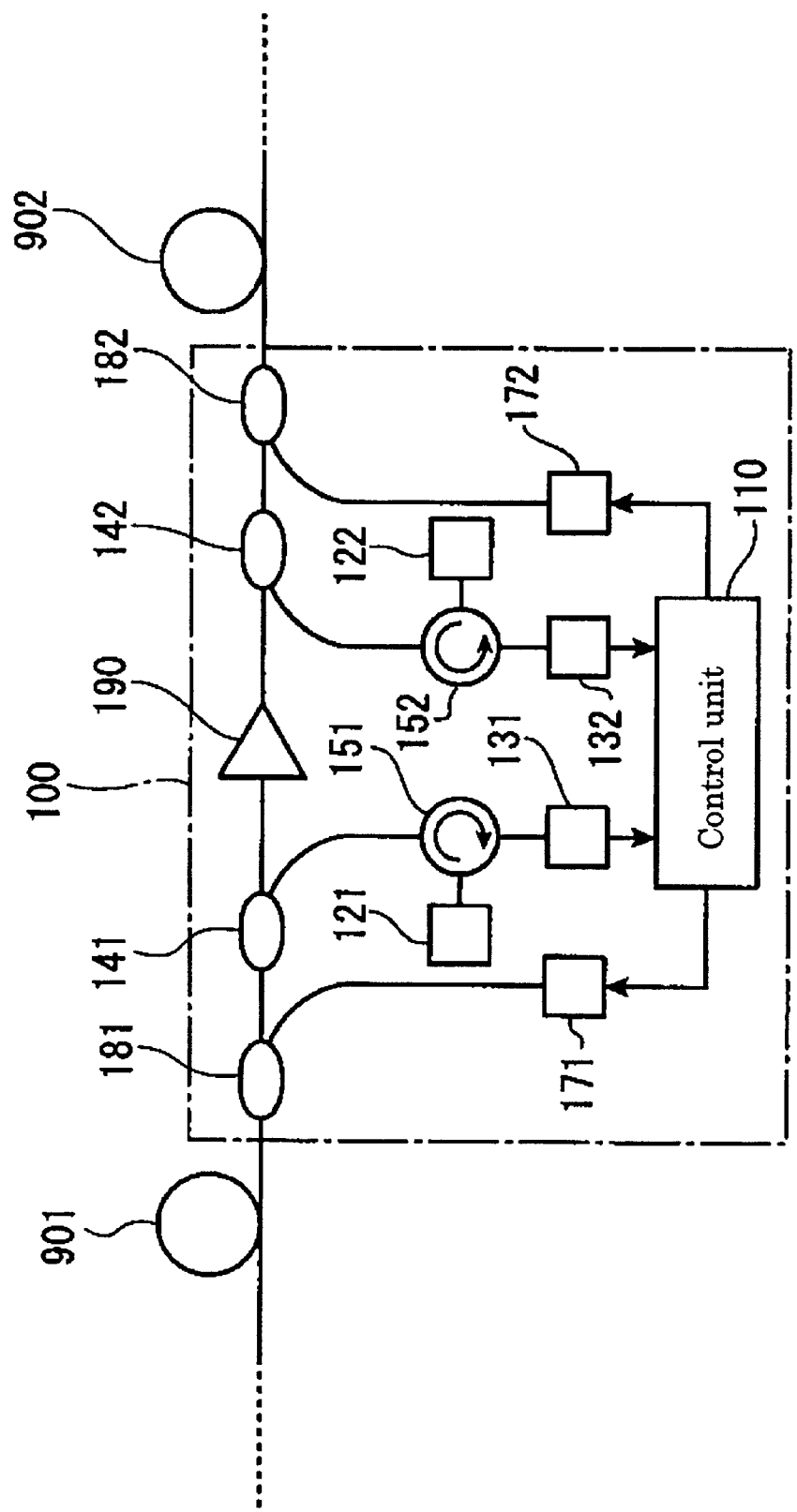
FIG. 3 is a schematic diagram of a station that includes a Raman amplifying control unit according to a first embodiment.

Next, a first embodiment of a Raman amplifying control unit provided in a station according to the present invention is explained. FIG. 3 is a schematic diagram of a station 100 that includes a Raman amplifying control unit according to the first embodiment. The station 100 can be used as the relay station $30_1$ or $30_2$ of the optical transmission system 1 shown in FIG. 1.

The station 100 is equipped with a control unit 110, inspection light sources 121 and 122, back-scattering light receivers 131 and 132, optical couplers 141 and 142 and optical circulators 151 and 152 as the elements that constitute the Raman amplifying control unit. Moreover, the station 100 is equipped with exciting light sources 171 and 172, optical couplers 181 and 182 and an EDFA 190.

The inspection light source 121, the optical coupler 141, and the optical circulator 151 constitute the inspection light introducing means for introducing the inspection light into an optical transmission line 901 to inspect the optical transmission line 901. That is, the inspection light source 121 outputs the inspection light, and the optical circulator 151 introduces the inspection light into it from inspection light source 121, and outputs the inspection light to the optical coupler 141. Then, the optical coupler 141 introduces the inspection light, which has reached it from the optical circulator 151, into the optical transmission line 901. Also, the optical coupler 141 outputs the signal light that has propagated through the optical transmission line 901 to an optical transmission line 902. The wavelength of the inspection light is within the wavelength band in which the gain of Raman amplification exists.

Similarly, the inspection light source 122, the optical coupler 142, and the optical circulator 152 constitute the inspection light introducing means for introducing the inspection light into the optical transmission line 902 to inspect the optical transmission line 902.

The back-scattering light receiver 131, the optical coupler 141, and the optical circulator 151 constitute a back-scattering light receiving means for receiving the back-scattering light that arises when the inspection light propagates through the optical transmission line 901. That is, the optical coupler 141 outputs the back-scattering light, which arises when the inspection light propagates through the optical transmission line 901, to the optical circulator 151. The optical circulator 151 outputs the back-scattering light, which has reached it from the optical coupler 141, to the back-scattering light receiver 131. Then, the back-scattering light receiver 131 receives the back-scattering light that has reached it from the optical circulator 151.

Similarly, the back-scattering light receiver 132, the optical coupler 142, and the optical circulator 152 constitute a back-scattering light receiving means for receiving the back-scattering light that arises when the inspection light propagates through the optical transmission line 902.

The control unit 110 inspects the optical transmission lines 901 and 902 based on the results of receiving the back-scattering light by the back-scattering light receivers 131 and 132, and according to such inspection result, it controls the supply of the pump light from the exciting light sources 171 and 172 to the optical transmission lines 901 and 902.

The exciting light source 171 and the optical coupler 181 constitute an exciting light supplying means for supplying pump light to the optical transmission line 901 to Raman-amplify the signal light in the optical transmission line 901. That is, the exciting light source 171 outputs the pump light for Raman amplification, and the optical coupler 181 introduces the pump light into the optical transmission line 901. Similarly, the exciting light source 172 and the optical coupler 182 constitute an exciting light supplying means for supplying the pump light to the optical transmission line 902 to Raman-amplify the signal light in the optical transmission line 902. The optical coupler 181 and the optical coupler 182 respectively output the signal light, which has propagated through the optical transmission line 901, to the optical transmission line 902.

The EDFA 190 is provided on a path in which the signal light propagates between the optical coupler 141 and the optical coupler 142. The EDFA 190 generally has an optical isolator to direct the signal light to propagate only in a forward direction in order to prevent the signal light and the pump light from propagating in an opposite direction.

Each element provided in the station 100 works as follows. The signal light having propagated through the optical transmission line 901 and entered into the station 100 enters into the EDFA 190 through the optical coupler 181 and the optical coupler 141, and after amplified in the EDFA 190, passes through the optical coupler 142 and the optical coupler 182, and then is outputted from the station 100 to propagate further through the optical transmission line 902.

The inspection light that has been outputted from the inspection light source 121 is introduced into the optical transmission line 901 through the optical circulator 151, the optical coupler 141, and the optical coupler 181 to propagate through the optical transmission line 901 in the direction opposite to the propagation of the signal light. The back-scattering light, which arises when the inspection light propagates through the optical transmission line 901, is received by the back-scattering light receiver 131 through the optical coupler 181, the optical coupler 141, and the optical circulator 151. Then, the loss distribution in the longitudinal direction of the optical transmission line 901 is measured based on the results of receiving the back-scattering light by the back-scattering light receiver 131 in the control unit 110. Then, according to the results of such measurement, the power or wavelength of the pump light for Raman amplification, which is supplied from the exciting light source 171 to the optical transmission line 901 via the optical coupler 181, is controlled.

Similarly, the back-scattering light receiver 132 receives the back-scattering light that arises when the inspection light outputted from the inspection light source 122 propagates through the optical transmission line 902. Then, the loss distribution in the longitudinal direction of the optical transmission line 902 is measured in the control unit 110, and the power or wavelength of the pump light for Raman amplification supplied from the exciting light source 172 into the optical transmission line 902 via the optical coupler 182 is controlled.

Thus, it is possible to stabilize the effective loss of the signal light in the optical transmission lines 901 and 902.

Also, in the present embodiment, the station 100 is equipped with not only an exciting light supplying means (comprising the exciting light sources 171 and 172 and the optical couplers 181 and 182) for supplying pump light to the optical transmission lines 901 and 902 to Raman-amplify signal light in the optical transmission lines 901 and 902, but also a Raman amplifying control unit (comprising the control unit 110, the inspection light sources 121 and 122, the back-scattering light receivers 131 and 132, the optical couplers 141 and 142, and the optical circulators 151 and 152). Consequently, the following effects can be obtained in the present embodiment.

That is, it is easy to stabilize the effective loss of the signal light in the optical transmission lines 901 and 902 because of the following reasons. Since the loss distribution of the optical transmission lines 901 and 902 of the relay section is measured in the station 100, the distance of the optical transmission lines 901 and 902 to be measured is comparatively short (for example, tens of km), and accordingly the loss distribution of the optical transmission lines 901 and 902 can be measured at a favorable S/N ratio. Furthermore, the precision of measurement can be improved by providing an optical filter in a position preceding the back-scattering light receivers 131 and 132 to allow only inspection light to pass it.

Also, because a Raman amplifying control unit is installed in the station 100 in the present embodiment, the loss distribution of the whole optical transmission lines 901 and 902 can be measured, avoiding an optical component including an optical isolator such as an optical fiber amplifier. Therefore, the stabilization of the effective loss can be achieved with respect to the signal light in the whole optical transmission lines 901 and 902.

Also, according to the present embodiment, independent control can be made in every station because a Raman amplifying control unit controls an exciting light supplying means within the station 100.

Furthermore, in the present embodiment, since an optical fiber amplifier is provided in the station 100, the optical amplification of signal light by Raman amplification can be complemented with the optical fiber amplifier.

Thus, in the present embodiment, even if the distance of the optical transmission line from a transmitting station to a receiving station is long, or even if an optical component including an optical isolator is provided in a relay station, or the like, the effective loss of the signal light in the optical transmission line can be stabilized, and it is unnecessary to provide a long-range control line.

(Second Embodiment of Raman Amplifying Control Unit)

Figure 4:
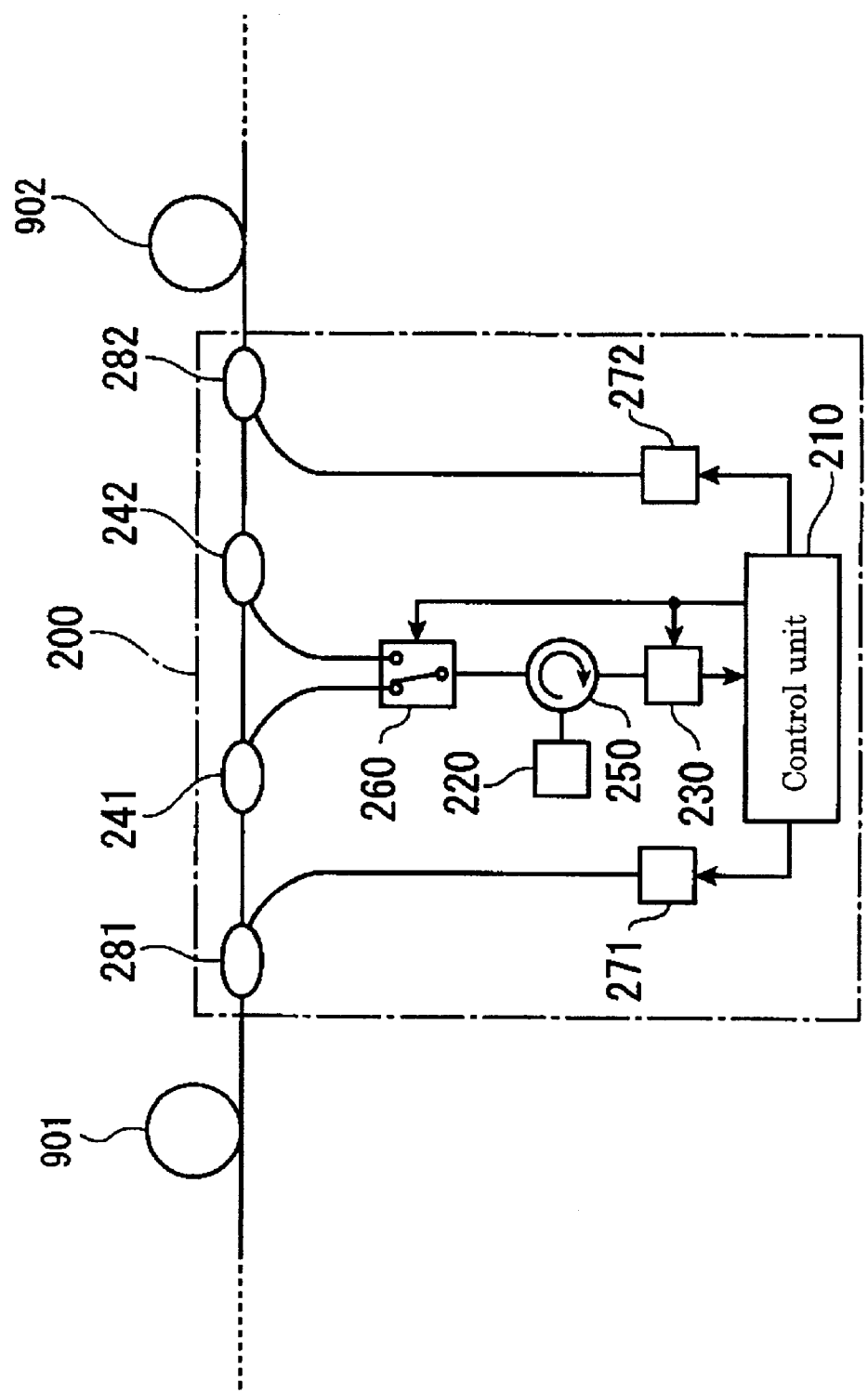
FIG. 4 is a schematic diagram of a station that includes a Raman amplifying control unit according to a second embodiment.

Next, a second embodiment of a Raman amplifying control unit provided in a station according to the present invention is explained. FIG. 4 is a schematic diagram of a station 200 that includes a Raman amplifying control unit according to the second embodiment. The station 200 can be used as the relay station $30_1$ or $30_2$ of the optical transmission system 1 shown in FIG. 1.

The station 200 is equipped with a control unit 210, an inspection light source 220, a back-scattering light receiver 230, optical couplers 241 and 242, an optical circulator 250, and an optical switch 260 as the elements that constitute the Raman amplifying control unit. Moreover, the station 200 is equipped with exciting light sources 271 and 272, and optical couplers 281 and 282. Also, in the present embodiment, in addition to the composition shown in FIG. 4, EDFA may be provided on the path of signal light propagation between the optical coupler 241 and the optical coupler 242.

The inspection light source 220, the optical couplers 241 and 242, the optical circulator 250, and the optical switch 260 constitute an inspection light introducing means for introducing the inspection light into the optical transmission line 901 or 902 to inspect the optical transmission line 901 or 902. That is, the inspection light source 220 outputs inspection light, the optical circulator 250 receives the inspection light outputted from the inspection light source 220, and outputs the inspection light to the optical switch 260. The optical switch 260 receives the inspection light that has reached it from the optical circulator 250, and outputs the inspection light to either the optical coupler 241 or the optical coupler 242. Then, the optical coupler 241 introduces the inspection light that has reached it from the optical switch 260 into the optical transmission line 901, and the optical coupler 242 introduces the inspection light that has reached it from the optical switch 260 into the optical transmission line 902. The optical coupler 241 and the optical coupler 242 respectively output signal light, which has propagated through the optical transmission line 901, into the optical transmission line 902. The wavelength of the inspection light is within the wavelength band in which Raman amplification gain exists.

The back-scattering light receiver 230, the optical couplers 241 and 242, the optical circulator 250, and the optical switch 260 constitute a back-scattering light receiving means for receiving the back-scattering light that arises when the inspection light propagates through the optical transmission line 901 or 902. That is, the optical coupler 241 outputs the back-scattering light, which arises when the inspection light propagates through the optical transmission line 901, to the optical switch 260. The optical coupler 242 outputs the back-scattering light, which arises when the inspection light propagates through the optical transmission line 902, to the optical switch 260. The optical switch 260 outputs the back-scattering light, which has reached it from the optical coupler 241 or the optical coupler 242, to the optical circulator 250. The optical circulator 250 outputs the back-scattering light, which has reached it from the optical switch 260, to the back-scattering light receiver 230. Then, the back-scattering light receiver 230 receives the back-scattering light that has reached it from the optical circulator 250.

The control unit 210 controls the optical switch 260, and allows it to introduce the inspection light outputted from the inspection light source 220 into either the optical transmission line 901 or the optical transmission line 902. It also enables the back-scattering light receiver 230 to receive the back-scattering light that arises in the optical transmission line 901 or 902. Also, the control unit 210 inspects the optical transmission line 901 or 902 based on the results of receiving the back-scattering light by the back-scattering light receiver 230. Then, the control unit 210 controls the supply of the pump light from the exciting light source 271 to the optical transmission line 901 according to the results of such inspection of the optical transmission line 901, and also according to the results of such inspection of the optical transmission line 902, controls the supply of the pump light from the exciting light source 272 to the optical transmission line 902.

The exciting light source 271 and the optical coupler 281 constitute an exciting light supplying means for supplying pump light to the optical transmission line 901 to Raman-amplify signal light in the optical transmission line 901. That is, the exciting light source 271 outputs the pump light for Raman amplification, and the optical coupler 281 introduces the pump light into the optical transmission line 901. Similarly, the exciting light source 272 and optical coupler 282 constitute an exciting light supplying means for supplying pump light to the optical transmission line 902 to Raman-amplify signal light in the optical transmission line 902.

Each element provided in the station 200 works as follows. The signal light having propagated through the optical transmission line 901 and entered into the station 200 passes the optical coupler 281, the optical coupler 241, the optical coupler 242, and the optical coupler 282, in the enumerated order, and is outputted from the station 200 to propagate further through the optical transmission line 902.

In the case where the optical switch 260 is set to optically connect the optical circulator 250 and the optical coupler 241 according to the control unit 210, the inspection light outputted from the inspection light source 220 is introduced into the optical transmission line 901 via the optical circulator 250, the optical switch 260, the optical coupler 241, and the optical coupler 281, and propagates through the optical transmission line 901 in the direction opposite to the propagation of the signal light. The back-scattering light that arises when the inspection light propagates through the optical transmission line 901 is received by the back-scattering light receiver 230 via the optical coupler 281, the optical coupler 241, the optical switch 260, and the optical circulator 250. Then, in the control unit 210, the loss distribution of the longitudinal direction of the optical transmission line 901 is measured based on the result of receiving the back-scattering light by the back-scattering light receiver 230. Then, according to the results of such measurement, the power or wavelength of the pump light for Raman amplification supplied to the optical transmission line 901 from the exciting light source 271 via optical coupler 281 is controlled.

Similarly, in the case where the optical switch 260 is set to optically connect the optical circulator 250 and the optical coupler 242 by the control unit 210, the loss distribution of the longitudinal direction of the optical transmission line 902 is measured, and according to the results of such measurement, the power or wavelength of the pump light for Raman amplification supplied from the exciting light source 272 to the optical transmission line 902 via the optical coupler 282 is controlled.

In this case, for example, one inspection light source which outputs inspection light is provided, and the inspection light outputted from the inspection light source is introduced by the switching means into the optical transmission line on the upper stream or the optical transmission line on the downstream, alternately, with respect to the relay station. The switching means may be a switch for switching an optical path, or it may be one equipped with an optical branching receptacle and two variable light attenuators that block or allow respective inspection light branched by the branching receptacle.

The present embodiment, in addition to the effects which the first embodiment exhibits, has additional merits, such as a reduced number of components, simple composition, a simplified control system, and improved reliability because the inspection light outputted from one inspection light source 220 can be introduced selectively into either of the optical transmission lines 901 or 902 by the optical switch 260.

(Third Embodiment of Raman Amplifying Control Unit)

Figure 5:
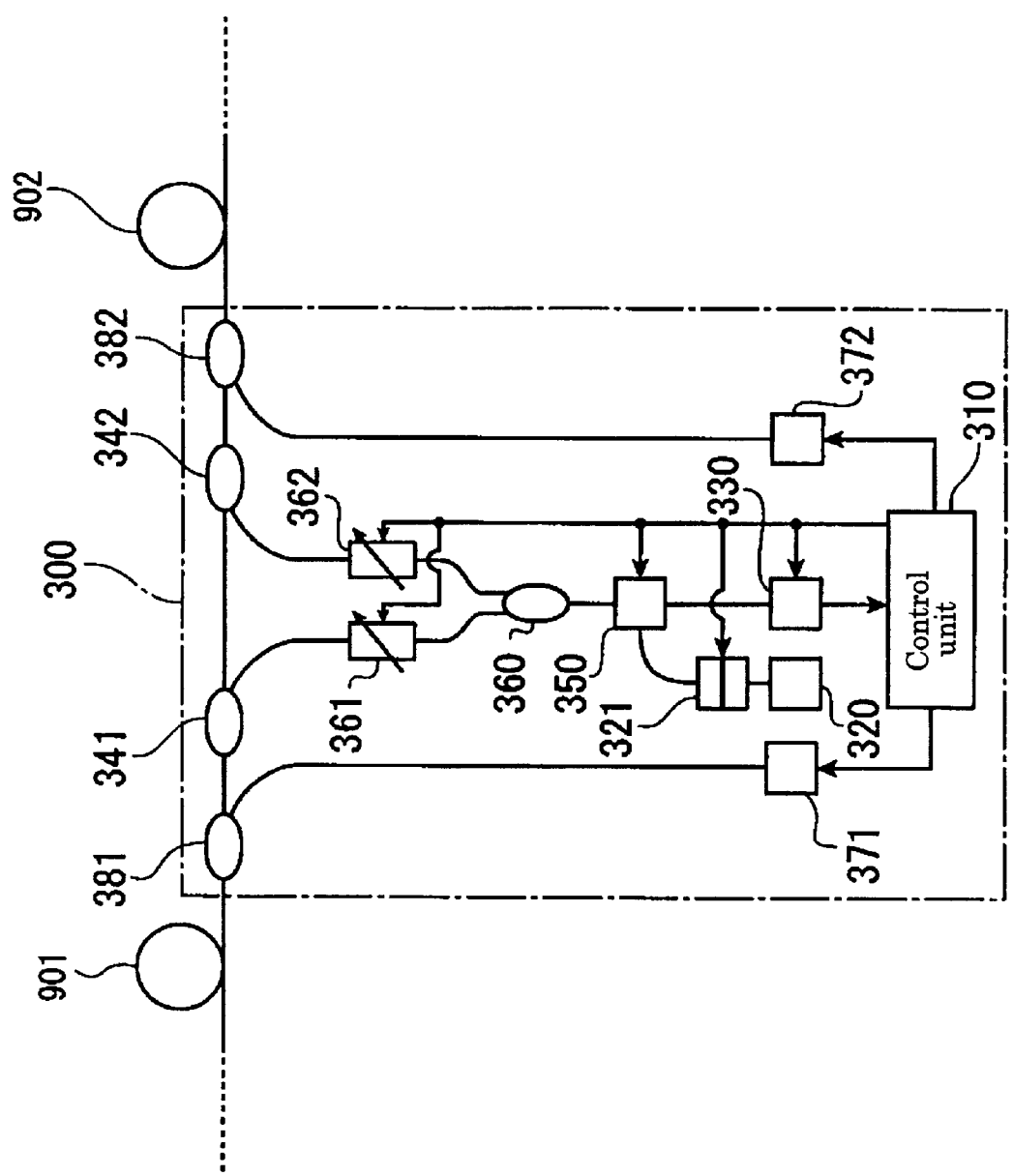
FIG. 5 is a schematic diagram of a station that includes a Raman amplifying control unit according to a third embodiment.

Next, a third embodiment of a Raman amplifying control unit provided in a station according to the present invention is explained. FIG. 5 is a schematic diagram of a station 300 that includes a Raman amplifying control unit according to the third embodiment. The station 300 can be used as the relay station $30_1$ or $30_2$ of the optical transmission system 1 shown in FIG. 1.

This station 300 is equipped with a control unit 310, an inspection light source 320, a polarization control unit 321, a back-scattering light receiver 330, optical couplers 341 and 342, an AO switch 350, an optical branching receptacle 360, and variable optical attenuators 361 and 362 as the elements that constitute a Raman amplifying control unit. Moreover, the station 300 is equipped with exciting light sources 371 and 372 and optical couplers 381 and 382. An EDFA may be provided on the signal light propagation path between the optical coupler 341 and the optical coupler 342 in the present embodiment.

The inspection light source 320, the polarization control unit 321, optical couplers 341 and 342, the AO switch 350, the optical branching receptacle 360, and variable optical attenuators 361 and 362 constitute the inspection light introducing means for introducing the inspection light into the optical transmission line 902 or 902 so as to inspect the optical transmission line 901 or 902. That is, the inspection light source 320 outputs inspection light. The polarization control unit 321, being controlled by the control unit 310, inputs into it the inspection light outputted from the inspection light source 320, causes the inspection light to become a linear polarization state or circular polarization state, and outputs the inspection light to the AO switch 350. The AO switch 350, being controlled by the control unit 310, inputs into it the inspection light outputted from the polarization control unit 321, and outputs the inspection light to the optical branching receptacle 360. The optical branching receptacle 360 receives the inspection light that has reached it from the AO switch 350, branches the inspection light into two to output each to the variable optical attenuator 361 or 362. Then, the variable optical attenuator 361 receives the inspection light that has reached it from the optical branching receptacle 360, allows the inspection light to pass at a transmissivity adjusted by the control unit 310, and outputs it to the optical coupler 341. The optical coupler 341 introduces the inspection light that has reached it from the variable optical attenuator 361 into the optical transmission line 901. On the other hand, the variable optical attenuator 362 receives the inspection light that has reached it from optical branching receptacle 360, allows the inspection light to pass at a transmissivity adjusted by the control unit 310, and outputs it to the optical coupler 342. The optical coupler 342 introduces the inspection light that has reached it from the variable optical attenuator 361 into the optical transmission line 902. The optical coupler 341 and the optical coupler 342 respectively output the signal light, which has propagated through the optical transmission line 901, to the optical transmission line 902. The wavelength of the inspection light is within the wavelength band in which the gain of Raman amplification exists.

The back-scattering light receiver 330, the optical couplers 341 and 342, the AO switch 350, the optical branching receptacle 360, and the variable optical attenuator 361 and 362 constitute a means for receiving the back-scattering light that arises when the inspection light propagates through the optical transmission line 901 or 902. That is, the optical coupler 341 outputs the back-scattering light, which arises when the inspection light propagates through the optical transmission line 901, to the variable optical attenuator 361, and the variable optical attenuator 361 receives the back-scattering light that has reached it from the optical coupler 341, allows the back-scattering light to pass at a transmissivity adjusted by the control unit 310, and outputs it to the optical branching receptacle 360. On the other hand, the optical coupler 342 outputs the back-scattering light, which arises when the inspection light propagates through the optical transmission line 902, to the variable optical attenuator 362, and the variable optical attenuator 362 receives the back-scattering light that has reached it from the optical coupler 342, allows the back-scattering light to pass at a transmissivity adjusted by the control unit 310, and outputs it to the optical branching receptacle 360. The optical branching receptacle 360 outputs the back-scattering light that has reached it from each of the variable optical attenuators 361 and the variable optical attenuator 362 to the AO switch 350. The AO switch 350, being controlled by the control unit 310, receives the back-scattering light that has reached it from the optical branching receptacle 360, and outputs the back-scattering light to the back-scattering light receiver 330. Then, the back-scattering light receiver 330 receives the back-scattering light that has reached it coming from the AO switch 350.

The control unit 310 controls the polarized state of the inspection light outputted from the polarization control unit 321. The control unit 310 controls the AO switch 350, and directs the inspection light outputted from the polarization control unit 321 to the optical branching receptacle 360 via the AO switch 350, or directs the back-scattering light outputted from the optical branching receptacle 360 to the back-scattering light receiver 330 via the AO switch 350. The control unit 310 controls one of the variable optical attenuators 361 and 362 to have a greater transmissivity and controls the other to have a smaller transmissivity. Also, based on the results of receiving the back-scattering light by the back-scattering light receiver 330, the control unit 310 inspects the optical transmission line 901 or 902. Then, according to the results of inspecting the optical transmission line 901, the control unit 310 controls the supply of the pump light from the exciting light source 371 to the optical transmission line 901, and also according to the results of inspecting the optical transmission line 902, controls the supply of the pump light from the exciting light source 372 to the optical transmission line 902.

The exciting light source 371 and the optical coupler 381 constitute an exciting light supplying means for supplying pump light to the optical transmission line 901 to Raman-amplify signal light in the optical transmission line 901. That is, the exciting light source 371 outputs the pump light for Raman amplification, and the optical coupler 381 introduces the pump light into the optical transmission line 901. Similarly, the exciting light source 372 and the optical coupler 382 constitute an exciting light supplying means for supplying pump light to the optical transmission line 902 to Raman-amplify signal light in the optical transmission line 902. Also, the optical coupler 381 and the optical coupler 382 respectively output signal light, which has propagated through the optical transmission line 901, to the optical transmission line 902.

Each element provided in the station 300 works as follows. The signal light having propagated through the optical transmission line 901 and entered into the station 300 passes through the optical coupler 381, the optical coupler 341, the optical coupler 342, and the optical coupler 382 in the enumerated order, and is outputted from the station 300 to propagate further through the optical transmission line 902.

In the case where the variable optical attenuator 361 is set to have a greater transmissivity, and the variable optical attenuator 362 is set to have a smaller transmissivity by the control unit 310, the inspection light that has been outputted from the inspection light source 320 and has been polarization-controlled by the polarization control unit 321 is introduced into the optical transmission line 901 via the AO switch 350, the optical branching receptacle 360, the variable optical attenuator 361, the optical coupler 341, and the optical coupler 381, and propagates through the optical transmission line 901 in the direction opposite to the propagation of the signal light. The back-scattering light that has arisen when the inspection light propagates through the optical transmission line 901 passes through the optical coupler 381, the optical coupler 341, the variable optical attenuator 361, the optical branching receptacle 360, and the AO switch 350, and is received by the back-scattering light receiver 330. Then, in the control unit 310, based on the results of receiving the back-scattering light by the back-scattering light receiver 330, the loss distribution in the longitudinal direction of the optical transmission line 901 is measured, and according to the results of such measurement the power or wavelength of the pump light for Raman amplification that is supplied from the exciting light source 371 to the optical transmission line 901 via the optical coupler 381 is controlled.

Similarly, in the case where the variable optical attenuator 362 is set to have a greater transmissivity, and the variable optical attenuator 361 is set to have a smaller transmissivity by the control unit 310, the loss distribution in the longitudinal direction of the optical transmission line 902 is measured, and according to the results of such measurement the power or wavelength of the pump light for Raman amplification that is supplied from the exciting light source 372 to the optical transmission line 902 via the optical coupler 382 is controlled.

In the present embodiment, in addition to the effects which the first embodiment exhibits, there are additional merits: the number of the components is reduced, the composition is simple, the control system is simplified, and the reliability is improved because the inspection light outputted from one inspection light source 320 can be introduced selectively into either of the optical transmission lines 901 or 902 by the optical branching receptacle 360 and the variable optical attenuators 361 and 362. Also, in the present embodiment, reduced cost and increased freedom in the composition of the equipment can be attained because the variable optical attenuators 361 and 362 are adopted.

Moreover, in the present embodiment, the measurement sensitivity can be improved by rendering inspection light into a linear polarization state with the polarization control unit 321, and also the reliability of the pump light control can be improved by rendering the inspection light into a circular polarization state.

Furthermore, not only can the reliability of the pump light control be further improved, but also the polarization dependence of Raman amplification gain can be estimated, by causing the inspection light to change temporally and alternately with respect to linear polarization of two directions crossing each other at right angles by means of the polarization control unit 321.

(Fourth Embodiment of Raman Amplifying Control Unit)

Figure 6:
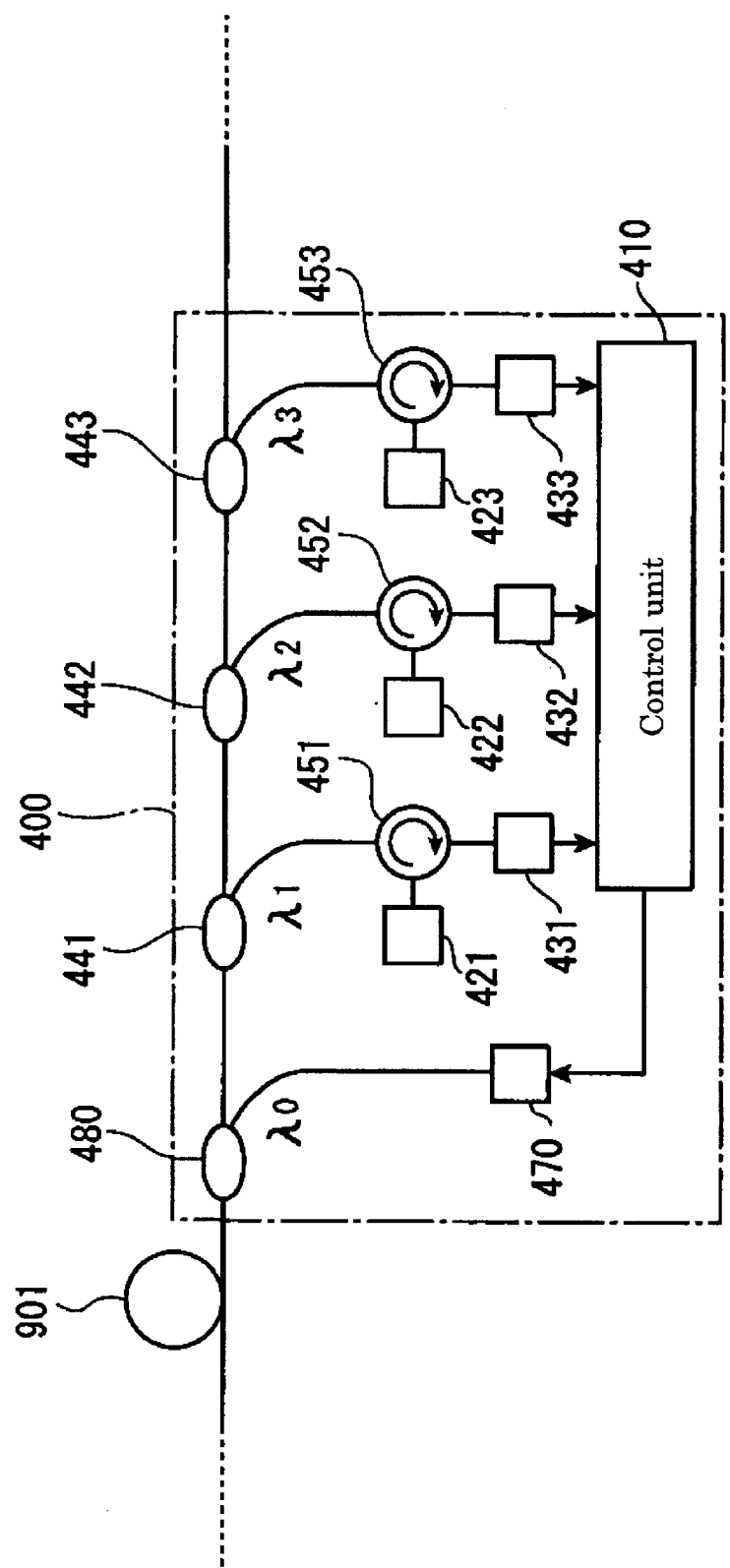
FIG. 6 is a schematic diagram of a station that includes a Raman amplifying control unit according to a fourth embodiment.

Next, a fourth embodiment of a Raman amplifying control unit provided in a station according to the present invention is explained. FIG. 6 is a schematic diagram of a station 400 that includes a Raman amplifying control unit according to the fourth embodiment. The station 400 can be used as the receiving station 200 of the optical transmission system 1 shown in FIG. 1. Also, the station 400 can be used as the relay station 30, or 302 of the optical transmission system 1 shown in FIG. 1 when Raman amplification is done in the optical transmission line of a relay section on the upper stream of the relay station.

The station 400 is equipped with a control unit 410, inspection light sources 421–423, back-scattering light receivers 431–433, optical couplers 441–443, and optical circulators 451–453 as the elements that constitute a Raman amplifying control unit. Moreover, the station 400 is equipped with an exciting light source 470 and an optical coupler 480.

The inspection light sources 421–423, the optical couplers 441–443, and the optical circulators 451–453 constitute an inspection light introducing means for introducing the inspection light into the optical transmission line 901 so as to inspect the optical transmission line 901. That is, the inspection light source 421 outputs inspection light with a wavelength of $\lambda 1$. The optical circulator 451 receives the inspection light, which has been outputted from the inspection light source 421, and outputs it to the optical coupler 441. Then, the optical coupler 441 introduces the inspection light that has reached it from the optical circulator 451 into the optical transmission line 901. The inspection light source 422 outputs inspection light with a wavelength of $\lambda 2$, and the inspection light source 423 outputs inspection light with a wavelength of $\lambda 3$. The inspection light with these wavelengths is similarly introduced into the optical transmission line 901. Each of the wavelengths $\lambda 1$, $\lambda 2$ and $\lambda 3$ is within the wavelength band in which the gain of Raman amplification exists, and is different from each other.

The back-scattering light receivers 431–433, the optical couplers 441–443 and the optical circulators 451–453 constitute a back-scattering light receiving means for receiving the back-scattering light that arises when the inspection light propagates through the optical transmission line 901. That is, the optical coupler 441 outputs the back-scattering light (wavelength $\lambda 1$), which arises when the inspection light (wavelength $\lambda 1$) propagates through the optical transmission line 901, to the optical circulator 451. The optical circulator 451 outputs the back-scattering light that has reached it from the optical coupler 441 to the back-scattering light receiver 431. Similarly, the back-scattering light receiver 432 receives the back-scattering light of wavelength $\lambda 2$, and the back-scattering light receiver 433 receives the back-scattering light of wavelength $\lambda 3$.

The control unit 410 inspects the optical transmission line 901 based on the results of receiving the back-scattering light by each of the back-scattering light receivers 431–433, and according to the results of such inspection, controls the supply of the pump light from the exciting light source 470 to the optical transmission line 901.

The exciting light source 470 and the optical coupler 480 constitute an exciting light supplying means for supplying pump light (wavelength $\lambda 0$) into the optical transmission line 901 to Raman-amplify signal light in the optical transmission line 901. That is, the exciting light source 470 outputs pump light for Raman amplification, and the optical coupler 480 introduces this pump light into the optical transmission line 901. The optical coupler 480 outputs the signal light, which has propagated through the optical transmission line 901, to the optical coupler 441.

Figure 7:
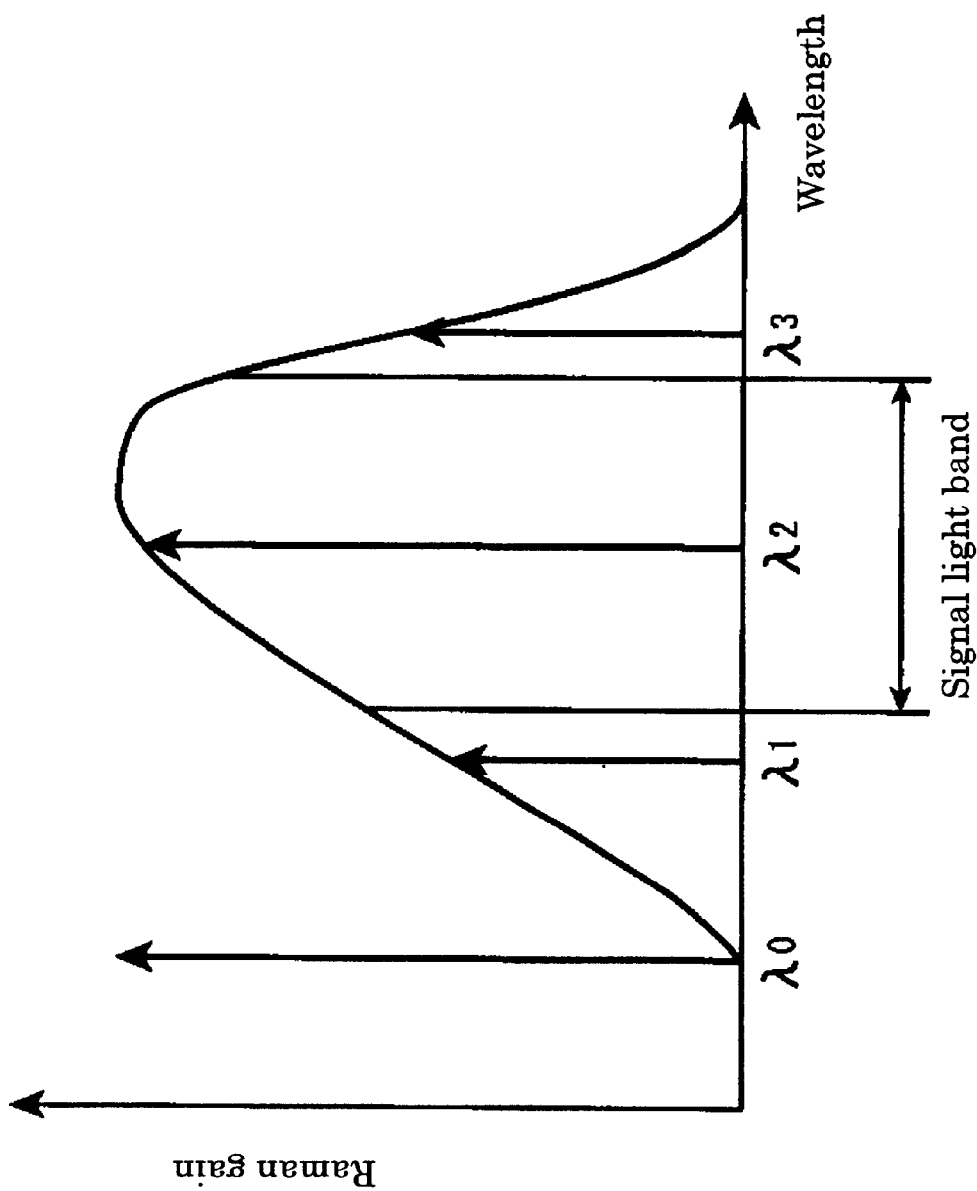
FIG. 7 illustrates the Raman gain distribution and wavelength of each pump light for Raman amplification and the inspection light which are outputted from a station that includes a Raman amplifying control unit according to the fourth embodiment.

FIG. 7 illustrates the Raman gain distribution and wavelength of both the pump light for Raman amplification and the inspection light which are outputted from a station 400 that includes a Raman amplifying control unit according to the fourth embodiment. As shown in this figure, Raman gain exists in a wavelength band on the side where the wavelengths are longer than the wavelength $\lambda 0$ of the pump light for Raman amplification. Each of the inspection light wavelengths $\lambda 1$, $\lambda 2$ and $\lambda 3$ exists in the wavelength band where Raman gain exists. Also, the wavelength of signal light exists in a wavelength band where Raman gain exists, especially, in a wavelength band where Raman gain is sufficiently great.

Each element provided in the station 400 works as follows.

The signal light that has propagated through the optical transmission line 901 and has entered into the station 400 passes through the optical couplers 480, 441, 442, and 443, and outputted from the station 400 to propagate further through an optical transmission line on the downstream.

The inspection light (λ1, λ2, λ3) outputted from the inspection light sources 421, 422, and 423 is introduced into the optical transmission line 901 via the optical circulators 451, 452, and 453, and the optical couplers 441, 442, and 443, respectively, and the optical coupler 480, and propagates through the optical transmission line 901 in a direction opposite to the propagation of the signal light. The back-scattering light (λ1, λ2, λ3) that arises when the inspection light propagates through the optical transmission line 901 passes through the optical coupler 480, the optical couplers 441, 442, and 443, and the optical circulators 451, 452, and 453, and is then received by the back-scattering light receivers 431, 432, and 433, respectively.

Then, in the control unit 410, the wavelength dependence of Raman gain and the loss distribution in the longitudinal direction of the optical transmission line 901 are measured based on the results of receiving the back-scattering light (wavelengths λ1, λ2, λ3) by each of the back-scattering light receivers 431–433. Then, according to the results of such measurement, the power or wavelength of the pump light for Raman amplification, which is supplied from the exciting light source 470 to the optical transmission line 901 via the optical coupler 480, is controlled.

In the present embodiment, in addition to the effects which the first embodiment exhibits, Raman amplification gain profile in the optical transmission line 901 can be evaluated with higher accuracy and the reliability of the optical transmission system can be improved because the power or wavelength of the pump light for Raman amplification which is supplied from the exciting light source 470 to the optical transmission line 901 via the optical coupler 480 is controlled according to the results of measuring the wavelength dependence of Raman gain and the loss distribution in the longitudinal direction of the optical transmission line 901, such measurement being done based on the results of receiving the back-scattering light with the respective wavelengths.

In the present embodiment, the inspection light with three wavelengths is used, but it may be with two wavelengths, or with four or more wavelengths. Also, instead of using a plurality of inspection light sources, only one inspection light source that can vary output wavelength may be used; in such case, the size of the equipment can be made smaller.

(Fifth Embodiment of Raman Amplifying Control Unit)

Figure 8:
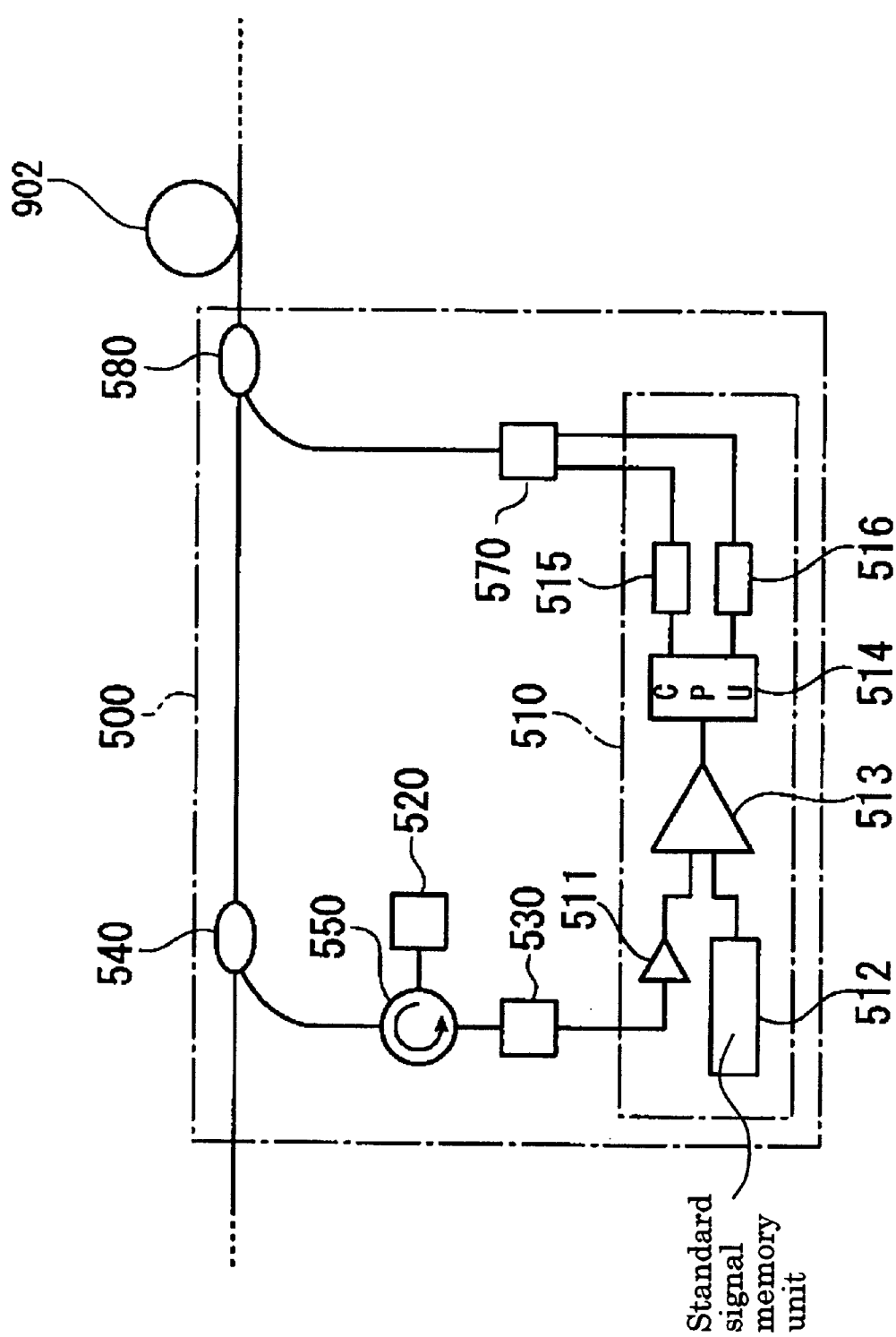
FIG. 8 is a schematic diagram of a station that includes a Raman amplifying control unit according to a fifth embodiment.

Next, a fifth embodiment of a Raman amplifying control unit provided in a station according to the present invention is explained. FIG. 8 is a schematic diagram of a station 500 that includes a Raman amplifying control unit according to the fifth embodiment. The station 500 can be used as the transmitting station 100 of the optical transmission system 1 shown in FIG. 1. Also, the station 500 can be used as the relay station $30_1$ or $30_2$ of the optical transmission system 1 shown in FIG. 1 when Raman amplification is done in the optical transmission line of a relay section on the downstream of the relay station.

The station 500 is equipped with a control unit 510, an inspection light source 520, a back-scattering light receiver 530, an optical coupler 540, and an optical circulator 550 as the elements that constitute a Raman amplifying control unit. The Raman amplifying control unit is the same as that of the optical transmission line 902 according to the first embodiment. Moreover, the station 500 is equipped with an exciting light source 570 and an optical coupler 580 as an exciting light supplying means for supplying the optical transmission line 902 with pump light for Raman amplification. The exciting light supplying means is the same as that of the optical transmission line 902 according to the first embodiment.

In FIG. 8, the composition of the control unit 510 is shown in detail. The control unit 510 is equipped with an amplifier 511, a standard signal memory unit 512, a differential circuit 513, a CPU 514, an electric current control unit 515, and a temperature control unit 516. The amplifier 511 receives the electric current signal outputted according to the intensity of the back-scattering light that the back-scattering light receiver 530 has received, changes the electric current signal into a voltage signal, and amplifies it to output. In the standard signal memory unit 512, a standard signal is stored beforehand, relating to the back-scattering light that arises in the optical transmission line 902. The differential circuit 513 receives the voltage signal outputted from the amplifier 511 and the standard signal stored in the standard signal memory unit 512, detects the difference between them, and outputs a differential signal according to the difference thus detected. The CPU 514 receives the differential signal outputted from the differential circuit 513, and according to the differential signal, controls the driving electric current which is supplied to the exciting light source 570 through the electric current control unit 515. It also controls the temperature of the exciting light source 570 through the temperature control unit 516. Thus, it controls the power or wavelength of the pump light for Raman amplification supplied from the exciting light source 570 to the optical transmission line 902.

Each element provided in the station 500 works as follows. The inspection light outputted from the inspection light source 520 is introduced into the optical transmission line 902 via the optical circulator 550, the optical coupler 540, and the optical coupler 580, and propagates through the optical transmission line 902 in the same direction as the signal light propagates. The back-scattering light that arises when the inspection light propagates through the optical transmission line 902 is received by the back-scattering light receiver 530 via the optical coupler 580, the optical coupler 540, and the optical circulator 550.

An electric current signal outputted from the back-scattering light receiver 530 is changed into a voltage signal by the amplifier 511 of the control unit 510. The difference between the voltage signal and the standard signal stored in the standard signal memory unit 512 is detected by the differential circuit 513, and according to the difference thus detected, a differential signal is outputted from the differential circuit 513. Then, according to the differential signal, the driving electric current supplied by the CPU 514 to the exciting light source 570 through the electric current control unit 515 is controlled. Also, the temperature of the exciting light source 570 is controlled through the temperature control unit 516, and thereby the power or wavelength of the pump light for Raman amplification supplied from the exciting light source 570 to the optical transmission line 902 via the optical coupler 580 is controlled.

The present embodiment, in addition to the effects which the first embodiment exhibits, is advantageous in that the condition of Raman amplification in the optical transmission line 902 can be easily controlled with the control unit 510 because the composition thereof is such that the difference between the voltage signal received by the back-scattering light receiver 530 and outputted therefrom through the amplifier 511 and the standard signal stored in the standard signal memory unit 512 is detected by the differential circuit 513, and according to the differential signal outputted thereby, the power or wavelength of the pump light for Raman amplification supplied from the exciting light source 570 to the optical transmission line 902 through the CPU 514, the electric current control unit 515, and the temperature control unit 516 is controlled.

(Sixth Embodiment of Raman Amplifying Control Unit)

Figure 9:
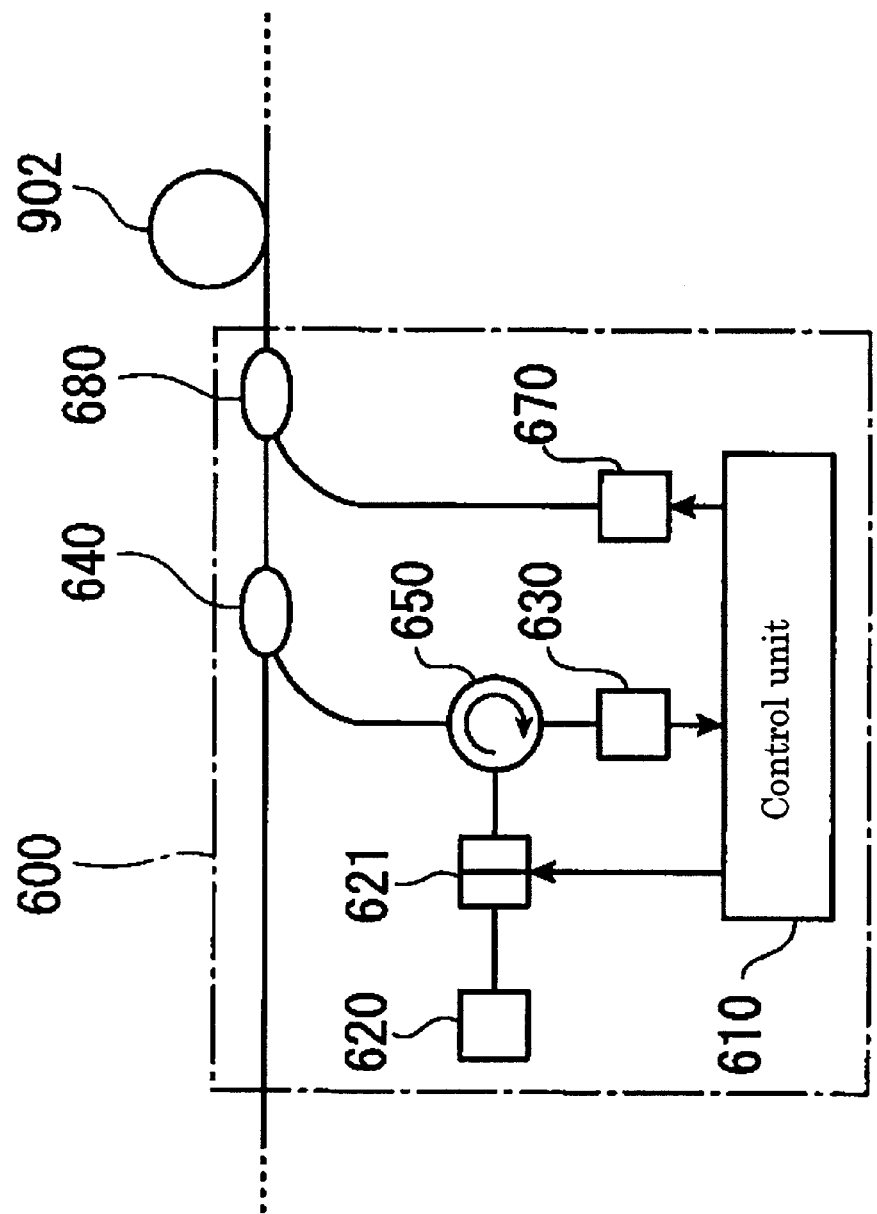
FIG. 9 is a schematic diagram of a station that includes a Raman amplifying control unit according to a sixth embodiment.

Next a sixth embodiment of a Raman amplifying control unit provided in a station according to the present invention is explained. FIG. 9 is a schematic diagram of a station 600 that includes a Raman amplifying control unit according to the sixth embodiment. The station 600 can be used as the transmitting station 100 of the optical transmission system 1 shown in FIG. 1. Also, the station 600 can be used as the relay station $30_1$ or $30_2$ of the optical transmission system 1 shown in FIG. 1 when Raman amplification is done in the optical transmission line of a relay section on the downstream of the relay station.

The station 600 is equipped with a control unit 610, an inspection light source 620, a polarization control unit 621, a back-scattering light receiver 630, an optical coupler 640, and an optical circulator 650 as the elements that constitute a Raman amplifying control unit, and the Raman amplifying control unit is nearly the same as that of the optical transmission line 902 in the first embodiment. Moreover, the station 600 is equipped with an exciting light source 670 and an optical coupler 680 as an exciting light supplying means for supplying the optical transmission line 902 with pump light for Raman amplification, and the exciting light supplying means is the same as that of the optical transmission line 902 in the first embodiment.

In the present embodiment, the polarization control unit 621 is provided between the inspection light source 620 and the optical circulator 650. The polarization control unit 621, being controlled by the control unit 610, receives the inspection light outputted from the inspection light source 620, and renders the inspection light into a linear polarization state of a given azimuth and outputs it to the optical circulator 650.

Figure 10:
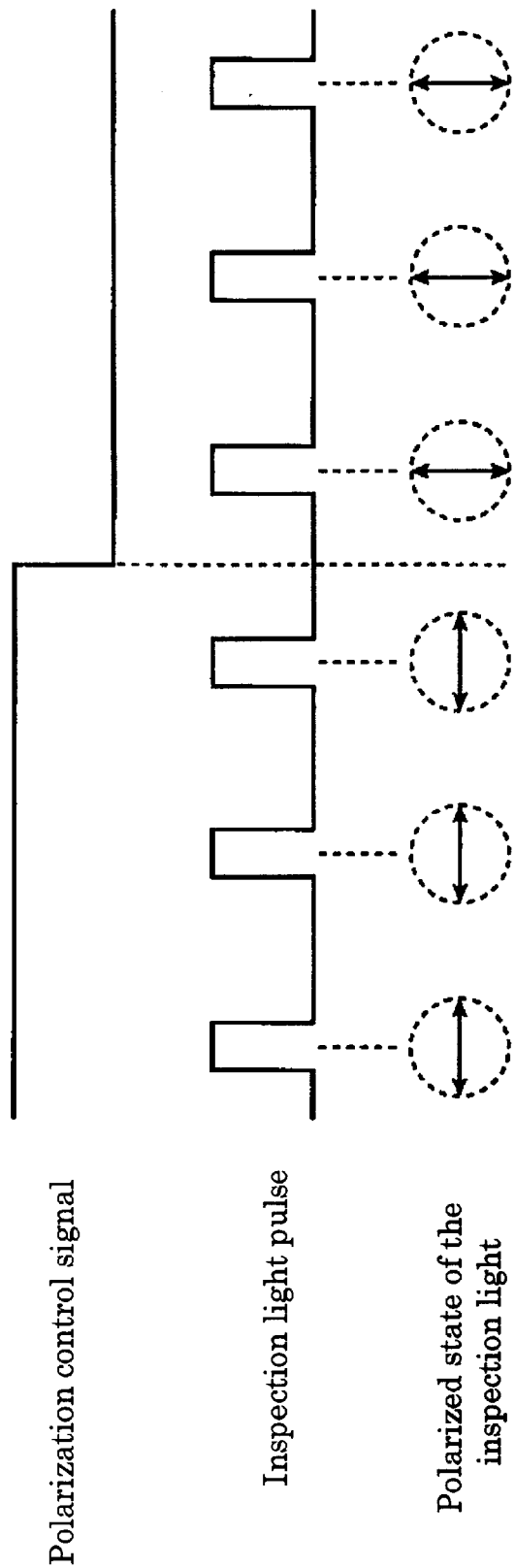
FIG. 10 illustrates the control of the polarization state of the inspection light by the polarization control unit in a Raman amplifying control unit according to the sixth embodiment.

FIG. 10 illustrates the control of the polarized state of the inspection light by the polarization control unit 621. The polarization control signal outputted from the control unit 610 to the polarization control unit 621 indicates the polarization state of the inspection light outputted from the polarization control unit 621. That is, the inspection light outputted from the polarization control unit 621 becomes a linear polarization state of a first azimuth when the polarized-state signal is at a high level, and when the polarized-state signal is at a low level, it becomes a linear polarization state of a second azimuth that crosses the first azimuth at right angles.

Each element provided in the station 600 works as follows. The inspection light outputted from the inspection light source 620 and rendered into a linear polarization state of a first azimuth by the polarization control unit 621 is introduced into the optical transmission line 902 via the optical circulator 650, the optical coupler 640, and the optical coupler 680, and propagates through the optical transmission line 902 in the same direction as the signal light propagates. The back-scattering light that arises when the inspection light propagates through the optical transmission line 902 is received by the back-scattering light receiver 630 via the optical coupler 680, the optical coupler 640, and the optical circulator 650. Then, in the control unit 610, the loss distribution in the longitudinal direction of the optical transmission line 902 is measured based on the results of receiving the back-scattering light by the back-scattering light receiver 630, and according to the results of such measurement, the power or wavelength of the pump light for Raman amplification supplied from the exciting light source 670 to the optical transmission line 902 via the optical coupler 680 is controlled.

Similarly, the inspection light outputted from the inspection light source 620 and rendered into a linear polarization state of a second azimuth by the polarization control unit 621 is also introduced into the optical transmission line 902 via the optical circulator 650, the optical coupler 640, and the optical coupler 680, and propagates through the optical transmission line 902 in the same direction as the signal light propagates. The back-scattering light that arises when the inspection light propagates through the optical transmission line 902 is received by the back-scattering light receiver 630 via the optical coupler 680, the optical coupler 640, and the optical circulator 650. Then, in the control unit 610, the loss distribution in the longitudinal direction of the optical transmission line 902 is measured based on the results of receiving the back-scattering light by the back-scattering light receiver 630, and according to the results of such measurement, the power or wavelength of the pump light for Raman amplification supplied from the exciting light source 670 to the optical transmission line 902 via the optical coupler 680 is controlled.

In the present embodiment, in addition to the effects which the first embodiment exhibits, there are additional merits: not only can the reliability of the pump light control be improved, but also the polarization dependence of Raman amplification gain can be estimated, by adopting the composition such that the inspection light is rendered, by means of the polarization control unit 621, to change temporally and alternately with respect to linear polarization of two azimuths that cross each other at right angles.

Instead of the polarization control unit 621 in the present embodiment, it may be provided with a polarization control unit that can render the inspection light outputted from the inspection light source 620 to a circular polarization state and a polarizer that can receive the inspection light in circular polarization and output it as polarized light of the first or second azimuth. In such case, the polarizer turns so that the optical axis may become the first or second azimuth according to the control of the control unit 610.

What is claimed is:

1. A Raman amplifying control unit which can control an exciting light supply means for supplying pump light into an optical transmission line so as to Raman amplify signal light in the optical transmission line of an optical transmission system having at least one relay station, said Raman amplifying control unit being equipped with:

inspection light introducing means for outputting inspection light to inspect an optical transmission line and introducing the inspection light into the optical transmission line;

back-scattering light receiving means for receiving the back-scattering light that arises when the inspection light propagates through the optical transmission line; and control means for finely adjusting a an exciting power and/or controlling a wavelength of pump light to the optical transmission line from said exciting light supplying means, such control being made according to the results of inspecting the optical transmission line according to the results of receiving the back-scattering light by the back back-scattering light receiving means;

wherein said inspection light introducing means, said back-scattering light receiving means, and said control means are provided together with said exciting light supplying means in a station on the transmitting side or receiving side of the optical transmission system.

2. A Raman amplifying control unit according to claim 1, wherein said station being a relay station, inspection light is introduced from said relay station into both the optical transmission line on the upper stream side thereof and the optical transmission line on the downstream side thereof.

3. A Raman amplifying control unit according to claim 2, wherein said inspection light introducing means has a switching means for introducing said inspection light outputted from the said inspection light source into said optical transmission line on the upper stream side and said optical transmission line on the downstream side.

4. A Raman amplifying control unit according to claim 3, wherein said switching means operates to switch at every given temporal interval, and such switching operation is controlled by said control means.

5. A Raman amplifying control unit according to claim 1, wherein said inspection light introducing means introduces said inspection light into said optical transmission line after rendering it into a prescribed polarization state.

6. A Raman amplifying control unit according to claim 1, wherein said inspection light introducing means introduces said inspection light into said optical transmission line, temporally changing the polarization state thereof.

7. A Raman amplifying control unit according to claim 1, wherein said inspection light introducing means uses light of more than one wavelength as said inspection light.

8. A Raman amplifying control unit according to claim 1, wherein said inspection light introducing means uses an inspection light outputting source that can vary the output wavelength of said inspection light.

9. A Raman amplifying control unit according to claim 1, wherein said control means controls the supply of said pump light to said optical transmission line by said exciting light supplying means according to the results of comparison between the results of receiving the back-scattering light by said back-scattering light receiving means and a pre-stored standard signal.

10. An optical transmission system including at least one relay station, which is provided with:

exciting light supplying means for supplying pump light into an optical transmission line so as to Raman amplify signal light therein;

inspection light introducing means for introducing inspection light into said optical transmission line so as to inspect said optical transmission line;

back-scattering light receiving means for receiving the back-scattering light that arises when said inspection light propagates through said optical transmission line; and control means for finely adjusting an exciting power and/or controlling a wavelength of said pump light to said optical transmission line from said exciting light supplying means, such control being made according to the results of inspecting said optical transmission line based on the results of receiving said back-scattering light by said back-scattering light receiving means;

wherein said inspection light introducing means, said back-scattering light receiving means, and said control means are provided together with said exciting light supplying means in a station on the transmitting side or receiving side of said optical transmission line in the relay section of said optical transmission system.

11. An optical transmission system according to claim 10, wherein said Raman amplifying control unit controls the power of the pump light supplied by said exciting light supplying means into said optical transmission line on the downstream side so that the power of signal light propagating through said optical transmission line on the downstream side does not exceed a pre-determined maximum value.

12. An optical transmission system according to claim 10, wherein said Raman amplifying control unit controls the power of the pump light supplied by said exciting light supplying means into said optical transmission line on the upper stream side so that the power of the signal light propagating through said optical transmission line on the upper stream side does not become lower than a pre-determined minimum value.

13. An optical transmission system according to claim 10, wherein an optical fiber amplifier is provided together with said Raman amplifying control unit in said station.

* * * * *

UNITED STATES PATENT AND TRADEMARK OFFICE
CERTIFICATE OF CORRECTION

PATENT NO. : 6,724,525 B2
DATED : April 20, 2004
INVENTOR(S) : Toshiaki Okuno et al.

It is certified that error appears in the above-identified patent and that said Letters Patent is hereby corrected as shown below:

<u>Column 18,</u>
Line 51, change "a an" to -- an --
Line 57, change "back back-scattering" to -- back-scattering --

Signed and Sealed this

Twenty-sixth Day of October, 2004

JON W. DUDAS
*Director of the United States Patent and Trademark Office*